United States Patent [19]

Sorimachi et al.

[11] Patent Number: 4,610,509

[45] Date of Patent: Sep. 9, 1986

[54] LIQUID CRYSTAL COLOR DISPLAY PANELS

[75] Inventors: Kazuaki Sorimachi; Hiroshi Tanabe, both of Saitama; Katsumi Aota, Tokyo; Kanetaka Sekiguchi; Seigo Togashi, both of Saitama; Etsuo Yamamoto, Tokyo, all of Japan

[73] Assignee: Citizen Watch Co., Ltd., Tokyo, Japan

[21] Appl. No.: 636,690

[22] Filed: Aug. 1, 1984

[30] Foreign Application Priority Data

Aug. 19, 1983 [JP] Japan ................... 58-151088

[51] Int. Cl.⁴ ................... G02F 1/13; G02B 5/22
[52] U.S. Cl. ................... 350/339 F; 350/350 F; 340/702
[58] Field of Search .......... 358/58, 59, 241; 350/339 F, 339 R, 350 F, 345, 337, 372, 408; 340/701–703

[56] References Cited

U.S. PATENT DOCUMENTS 4,204,222  5/1980  Zacharie ................... 358/59
4,556,287  12/1985  Funada et al. ................... 350/350 F Primary Examiner—A. Evans
Attorney, Agent, or Firm—Koda and Androlia

[57] ABSTRACT

In a liquid crystal color display panel comprising a color filter layer superposed on one surface of a liquid crystal shutter device for transmitting or intercepting light by the application of a voltage across electrode groups. This color filter layer is formed of photosensitive emulsion layers which are sensitive to specific color light respectively and provided on a transparent plate. While illuminating the liquid crystal shutter device from the other surface thereof by specific color light sequentially. The voltage is applied across selected opposed electrode groups to form latent images in alignment with the positions of the electrode groups. Then, the latent images are developed to produce colors. In this manner, filter layers are made in alignment with the shutter device.

5 Claims, 21 Drawing Figures

RED LIGHT

GREEN LIGHT

BLUE LIGHT

CYAN LIGHT (GREEN+BLUE)

MAGENTA LIGHT (RED + BLUE)

YELLOW LIGHT (RED + GREEN)

RED LIGHT

GREEN LIGHT

BLUE LIGHT

WHITE LIGHT

LIQUID CRYSTAL COLOR DISPLAY PANELS

BACKGROUND OF THE INVENTION

1. Field of the Invention

This invention relates to a liquid crystal color display panel and more particularly to a liquid crystal color display panel having a color filter which can be in self alignment with picture elements utilizing color photographic technology.

2. Description of the Prior Art

The high density liquid crystal display panel has reached a practical stage and has been applied to a portable liquid crystal television panel or the like. The liquid crystal display panel is now in a color-picture stage. Because of an increase in information by color discrimination, it is essential to display pictures in colors, and most picture element displays using a CRT are color displays.

In order to display a liquid crystal panel in colors, basically, a liquid crystal light shutter and a multicolored filter are only required. In the additive color mixture process which is a typical color mixture, a white light irradiation onto a blue, green and red colored filter is controlled by a liquid crystal light shutter. The high density liquid crystal light shutter is available in the multiplex passive type and the active type using polysilicon thin film transistors. A color display is possible in the additive color mixture by a color filter sheet formed by aligning blue, green, and red filter elements with the picture elements by ⅓ thereof respectively. The color filter used in the liquid crystal color display panel requires easy fabrication of a minute filter of good color purity and easy alignment of the filter with a minute liquid crystal shutter, and such.

Conventionally, in the fabrication of a color filter, printing or dyeing in one color has been repeated at least three times. However, the former is difficult to fabricate a minute filter, and the latter is not easy to select dyeing portions of the filter. It is also essential to align the filter with the liquid crystal light shutter. This alignment requires a precision operation and jig for it. Thus, the conventional fabrication involves a risk in mass production.

SUMMARY OF THE INVENTION

The object of the invention is to provide a liquid crystal color display panel in which all the above conventional problems are solved at a time. The subject matter of the invention is to provide a liquid crystal color display panel in which a multicolored filter is formed by exposing and developing photosensitive emulsion layers, the filter with various colors being in self alignment with a liquid crystal light shutter by controlling colors and positions of exposure light onto the filter.

According to one aspect of the invention, there is provided a liquid crystal display panel comprising a liquid crystal shutter device having, a pair of opposed glass plates, opposed electrode groups on the respective inner surfaces of the glass plates, at least one polarizer, a liquid crystal layer between the opposed electrode groups, and a voltage applying means for selectively applying a voltage across the electrode groups, and a color filter having a photosensitive emulsion layer sensitive to specific color light and provided on another transparent glass plate, the arrangement being such that the color filter is superposed on one surface of the liquid crystal shutter device and being processed by the steps of, while illuminating the liquid crystal shutter device from the other surface thereof by the specific color light, applying the voltage across the opposed electrode groups through the voltage applying means to form a latent image on the photosensitive emulsion layer, the latent image being aligned with the electrode groups, and after a while, developing the latent image.

According to another aspect of the invention, there is provided a liquid crystal display panel with a color filter comprising a liquid crystal shutter device having, a pair of opposed glass plates, opposed electrode groups on the respective inner surfaces of the glass plates, at least one polarizer, a liquid crystal layer between the opposed electrode groups, and a voltage applying means for selectively applying a voltage across the electrode groups, and a color filter having, a blue photosensitive emulsion layer including a yellow color coupler and provided on another transparent glass plate, a yellow coloid silver gelatin layer, a green photosensitive emulsion layer including a magenta color coupler, an intermediate gelatin layer, a red photosensitive emulsion layer including a cyan color coupler, and a gelatin protective layer, the arrangement being such that the color filter is superposed on one surface of the liquid crystal shutter device and being processed by the steps of, while illuminating the liquid crystal shutter device from the other surface thereof by one of red, green and blue light, applying a voltage across the first selected electrode groups through the voltage applying means to prevent the light from passing through the liquid crystal to which the voltage is applied and to expose a portion of the photosensitive emulsion layer sensitive to the color light, thereby forming a first pattern latent image, while illuminating the liquid crystal shutter device from the other surface thereof by one of red, green and blue color light other than the color light used for forming the first pattern latent image, applying a voltage across the second selected electrode groups through the voltage applying means to prevent the light from passing through the liquid crystal to which the voltage is applied and to expose a portion of the photosensitive emulsion layer sensitive to the color light, thereby forming a second pattern latent image, while illuminating the liquid crystal shutter device from the other surface thereof by one of red, green and blue color light other than the color light used for forming the first and second latent images, applying a voltage across the third selected electrode groups through the voltage applying means to prevent the light from passing through the liquid crystal to which the voltage is applied and to expose a portion of the photosensitive emulsion layer sensitive to the color light, thereby forming a third pattern latent image, after a while, developing the latent images to color the latent image formed on the red photosensitive layer, cyan, the latent image formed on the green photosensitive layer, magenta, and the latent image formed on the blue photosensitive layer, yellow, whereby the plurality of color layers are laminated to form a multilayer and multicolored filter.

According to a further aspect of the invention, there is provided a liquid crystal display panel with a color filter comprising a liquid crystal shutter device having, a pair of opposed glass plates, opposed electrode groups on the respective inner surfaces of the glass plates, at least one polarizer, a liquid crystal layer between the opposed electrode groups, and a voltage applying means for selectively applying a voltage across the electrode groups, and a color filter having, a blue photosensitive emulsion layer including a yellow color coupler and provided on another transparent glass plate, a yellow coloid silver gelatin layer, a green photosensitive emulsion layer including a magenta color coupler, an intermediate gelatin layer, a red photosensitive emulsion layer including a cyan color coupler, and a gelatin protective layer, the arrangement being such that the color filter is superposed on the liquid crystal shutter device and being processed by the steps of, while illuminating the liquid crystal shutter device from the other surface thereof by one of cyan, magenta and yellow light, applying a voltage across the first selected electrode groups through the voltage applying means to prevent the light from passing through the liquid crystal to which the voltage is applied and to expose portions of the two photosensitive emulsion layers each sensitive to the color light, thereby forming first pattern latent images on the two layers, while illuminating the liquid crystal shutter device from the other surface thereof by one of cyan, magenta and yellow color light other than the color light used for forming the first pattern latent images, applying a voltage across the second selected electrode groups through the voltage applying means to prevent the light from passing through the liquid crystal to which the voltage is applied and to expose portions of the two photosensitive emulsion layers each sensitive to the color light, thereby forming second pattern latent images on the two layers, while illuminating the liquid crystal shutter device from the other surface thereof by one of cyan, magenta and yellow color light other than the color light used for forming the first and second latent images, applying a voltage across the third selected electrode groups through the voltage applying means to prevent the light from passing through the liquid crystal to which the voltage is applied and to expose portions of the two photosensitive emulsion layers each sensitive to the color light, thereby forming third pattern latent images on the two layers, after a while, developing the latent images to color the latent image formed on the red photosensitive layer, cyan, the latent image formed on the green photosensitive layer, magenta, and the latent image formed on the blue photosensitive layer, yellow, whereby the plurality of color layers are laminated to form a multilayer and multicolored filter.

According to an even further aspect of the invention, there is provided a liquid crystal display panel with a color filter comprising a liquid crystal shutter device having, a pair of opposed glass plates, opposed electrode groups on the respective inner surfaces of the glass plates, at least one polarizer, a liquid crystal layer between the opposed electrode groups, and a voltage applying means for selectively applying a voltage across the electrode groups, and a color filter having, a blue photosensitive emulsion layer including a yellow color coupler and provided on another transparent glass plate, a yellow coloid silver gelatin layer, a green photosensitive emulsion layer including a magenta color coupler, an intermediate gelatin layer, a red photosensitive emulsion layer including a cyan color coupler, and a gelatin protective layer, the arrangement being such that the color filter is superposed on the liquid crystal shutter device and being processed by the steps of, while illuminating the liquid crystal shutter device from the other surface thereof by one of red, green and blue light, applying a voltage across the first selected electrode groups through the voltage applying means to prevent the light from passing through the liquid crystal to which the voltage is applied and to expose a portion of the photosensitive emulsion layer sensitive to the color light, thereby forming a first pattern latent image, while illuminating the liquid crystal shutter device from the other surface thereof by one of red, green and blue color light other than the color light used for forming the first pattern latent image, applying a voltage across the second selected electrode groups through the voltage applying means to prevent the light from passing through the liquid crystal to which the voltage is applied and to expose a portion of the photosensitive emulsion layer sensitive to the color light, therby forming a second pattern latent image, while illuminating the liquid crystal shutter device from the other surface thereof by one of red, green and blue color light other than the color light used for forming the first and second latent images, applying a voltage across the third selected electrode groups through the voltage applying means to prevent the light from passing through the liquid crystal to which the voltage is applied and to expose a portion of the photosensitive emulsion layer sensitive to the color light, thereby forming a third pattern latent image, after a while, developing the latent images by a first development to produce negative images and developing the negative images by a reversal color development to color the portions other than latent images formed on the red photosensitive emulsion layer, cyan, the portions other than latent images formed on the green photosensitive emulsion layer, magenta, and the portions other than latent images formed on the blue photosensitive emulsion layer, yellow, whereby the plurality of color layers are laminated to form a multilayer and multicolored filter.

DETAILED DESCRIPTION OF THE PREFERRED EMBODIMENTS

Figure 1A:
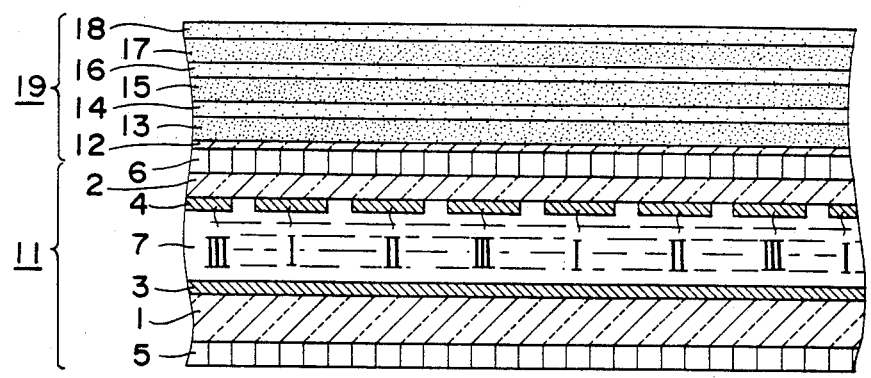
FIGS. 1 (A) to (F) are partially sectional views of a first example of a liquid crystal display panel with a multilayer color filter according to the invention.
Figure 1B:
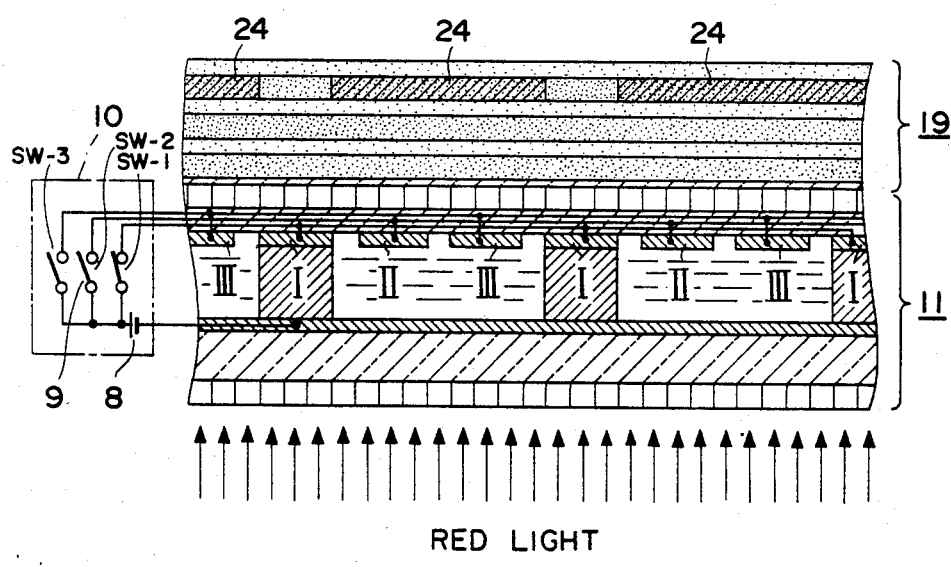
Figure 1:
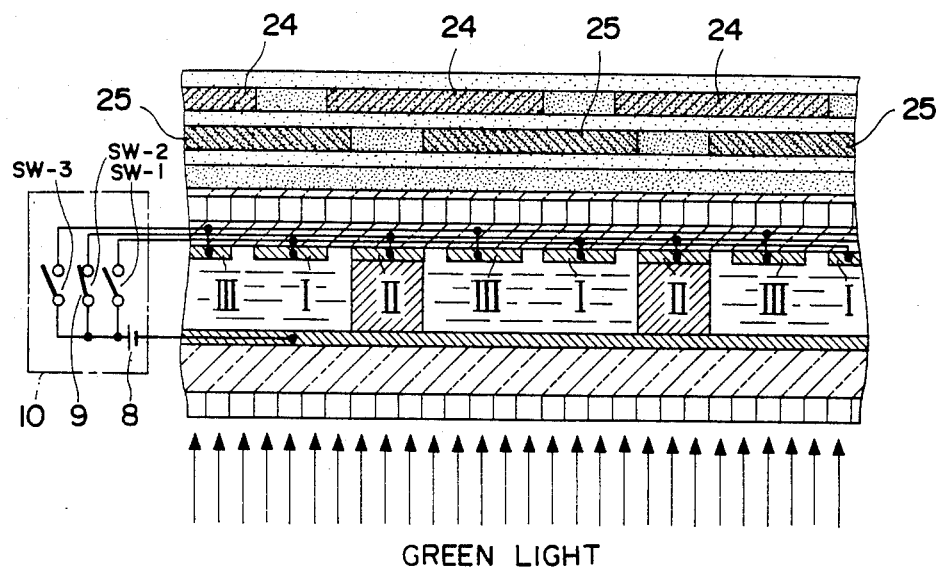
Figure 1:
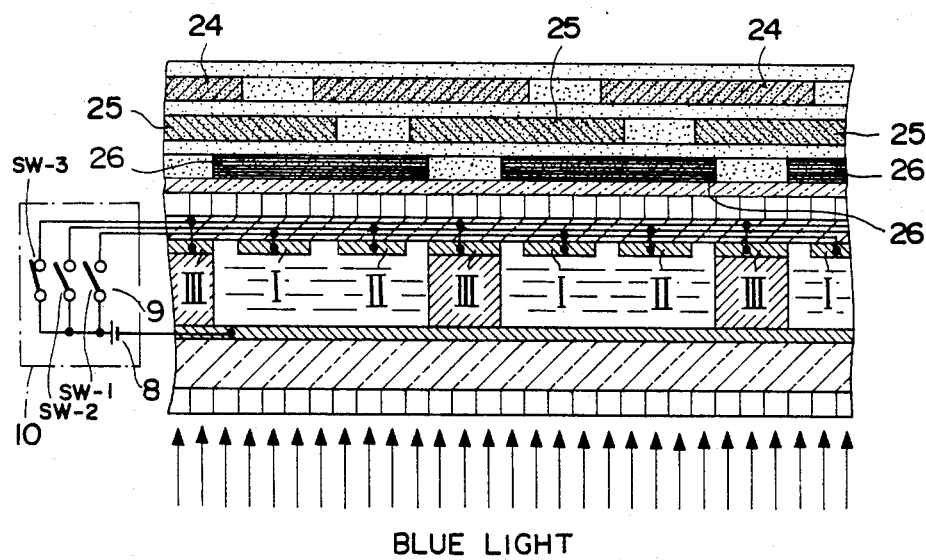
Figure 1:
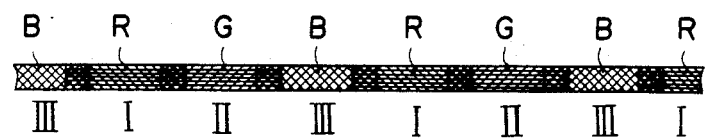
Figure 1:
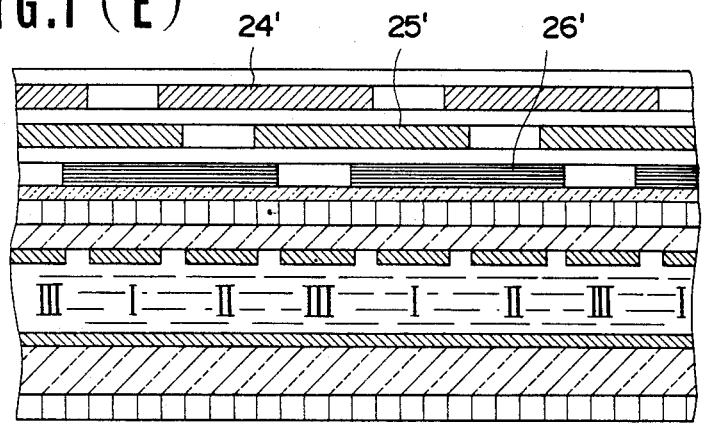

FIGS. 1 (A) to (F) are partially sectional views of an original structure of a liquid crystal display panel with a filter of the invention formed by superposing a multilayer color film 19 on a liquid crystal shutter device 11; the liquid crystal shutter device 11 having a pair of opposed glass plates 1, 2; opposed electrode groups 3, 4 on the respective inner surfaces of the glass plates 1, 2; polarizers 5, 6; a liquid crystal layer 7 sealed between both glass plates 1, 2; and a voltage applying means 10 including a power supply 8 and switches 9 for selectively applying a voltage across the electrode groups 3, 4; and the multilayer color film 19 having a blue photosensitive emulsion layer 13 including a yellow color coupler on a transparent glass plate 12; a yellow coloid silver gelatin filter film 14 provided thereon; a green photosensitive emulsion layer 15 including a magenta color coupler; an intermediate gelaton layer 16; a red photosensitive emulsion layer 17 including a cyan color coupler; and a gelaton protective layer 18.

Figure 2A:
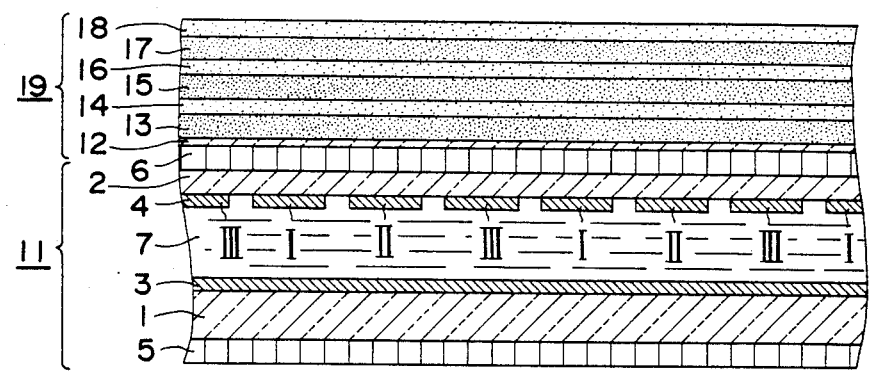
FIGS. 2 (A) to (F) are partially sectional views of a second example.
Figure 2B:
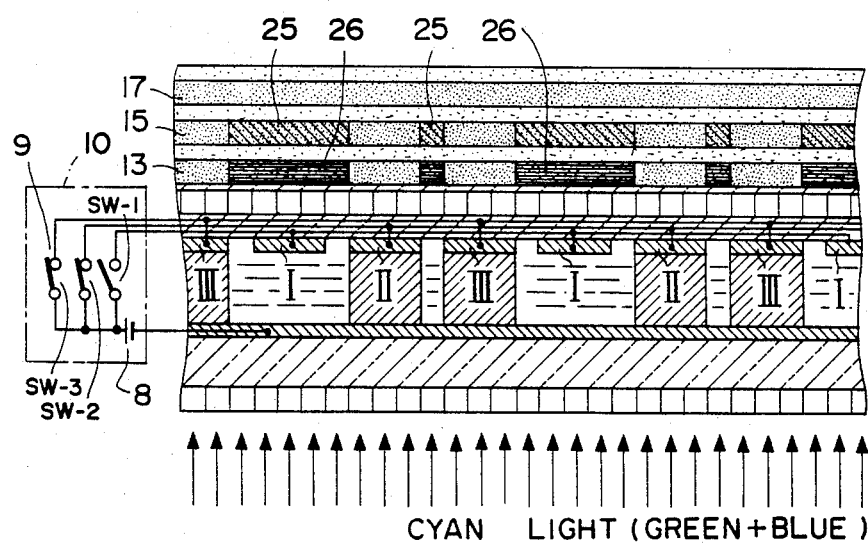

This original structure is used in common to all the examples shown as the first, second and third examples (FIGS. 1A, 2A and 3A).

Since the glass plate 2 is preferably as thin as possible to minimize the parallax due to the distance from the liquid crystal 7 to the polarizer 6, a micro glass made by CONING COMPANY is used herein. The use of glass beads, etc. as a spacer in the liquid crystal layer 7 eliminates a problem with strength. The transparent glass 12 of the multilayer color film 19 is attached to the liquid crystal shutter 11 in a darkroom. In this attachment, positioning accuracy is not necessary.

Figure 4:
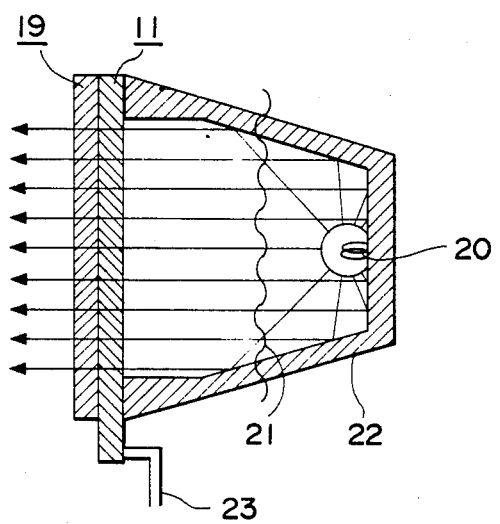
FIG. 4 is a sectional view of a photosensitive jig.
Figure 5:
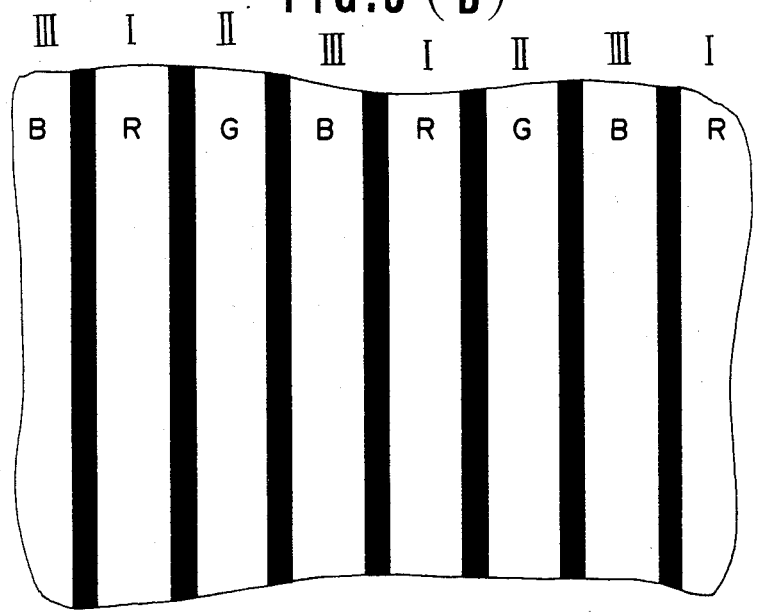
Figure 5:
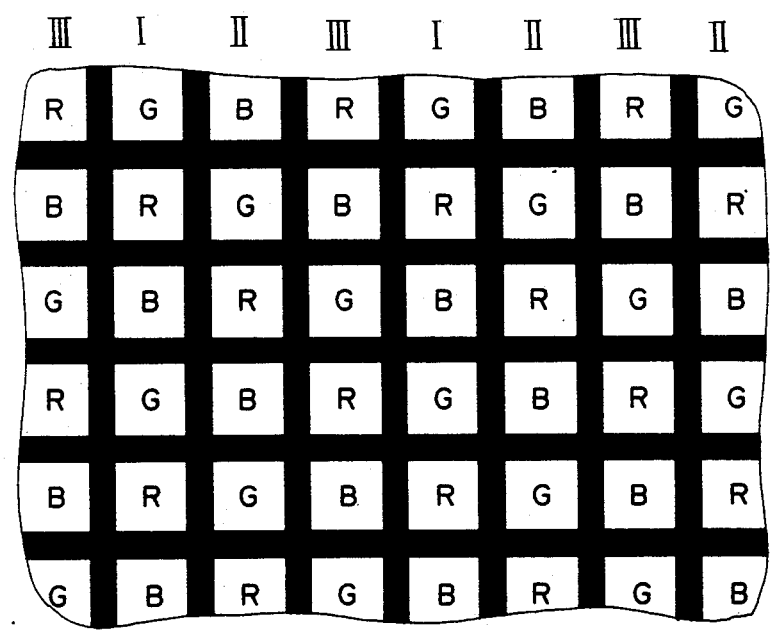

Next, the multilayer color film 19 including photosensitive emulsion layers is exposed to light. For exposure, a jig, for example, shown in a sectional view of FIG. 4 is used. In FIG. 4, 20 is a white light source; 21 is a filter which is replaceable to a red, green, blue cyan, magenta or yellow filter; 22 is a frame which also serves as a light shield; and 23 is a probe for driving the liquid crystal shutter 11. On this jig, the liquid crystal shutter 11 is mounted with the color filter layer 19 including the photosensitive emulsion layers faced outside.

There are two types of combinations of a color produced after development and a color of light to be used for exposure. One is the negative process and the other is the reversal process. The difference between them is made by each development method.

EXAMPLE I

The liquid crystal shutter with a multilayer filter of FIG. 1 (A) was set on the photosensitive jig of FIG. 4. First, by use of a red filter as the filter 21, while the shutter was illuminated from the rear by red light, as shown in FIG. 1 (B), SW-1 was turned ON with SW-2 and SW-3 OFF. As a result, the light was prevented from passing through the portions I of the liquid crystal layer to which a voltage was applied through SW-1, and the portions of the red photosensitive emulsion layer 17 exposed to the light formed latent images 24.

Next, a green filter was set on the photosensitive jig. While the shutter was illuminated from the rear by green light, as shown in FIG. 1 (C), SW-2 was turned ON with SW-1 and SW-3 OFF. As a result, the light was prevented from passing through the portions II of the liquid crystal layer to which a voltage was applied through SW-2, and the portions of the green photosensitive emulsion layer 15 exposed to the light formed latent images 25.

Furthermore, a blue filter was set on the photosensitive jig. While the shutter was illuminated from the rear by blue light, as shown in FIG. 1 (D), SW-3 was turned ON with SW-1 and SW-2 OFF. As a result, the light was prevented from passing through the portions III of the liquid crystal layer to which a voltage was applied through SW-3, and the portions of the blue photosensitive emulsion layer 13 exposed to the light formed latent images 26.

As mentioned above, the shutter was illuminated by red, green and blue light to form the latent images, 24, 25 and 26 on the photosensitive emulsion layers 17, 15 and 13, respectively. The layers were then developed to produce colors. Thus, as shown in FIG. 1 (E), the latent images 24 on the red photosensitive emulsion layer 17 was colored cyan 24', the latent images 25 on the green photosensitive emulsion layer 15, magenta 25', and the latent images 26 on the blue photosensitive emulsion layer 13, yellow 26'.

Therefore, as shown in FIGS. 1 (E) and (F), when the liquid crystal display panel with a multilayer filter formed in this way was illuminated from the rear by white light, the following colors appeared:

cyan 24' + magenta 25' = blue III cyan 24' + yellow 26' = green II magenta 25' + yellow 26' = red I.

Also, the portion where the above colors overlapped produced the following color:

cyan 24' + to magenta 25' + yellow 26' = black.

Figure 5:
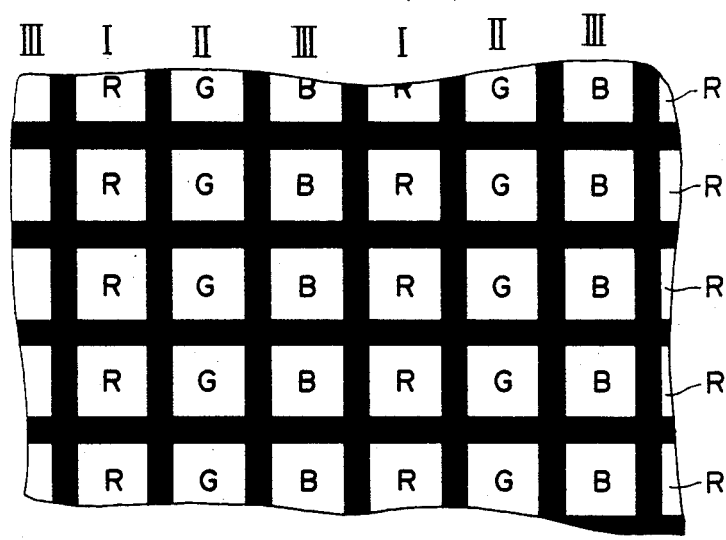
FIGS. 5 (A) to (C) are partially front views of picture portions formed by the above liquid crystal panels each with a color filter.

When viewed from the top, black stripes were seen, as shown in FIG. 5 (A), (B) or (C).

EXAMPLE II

Figure 2:
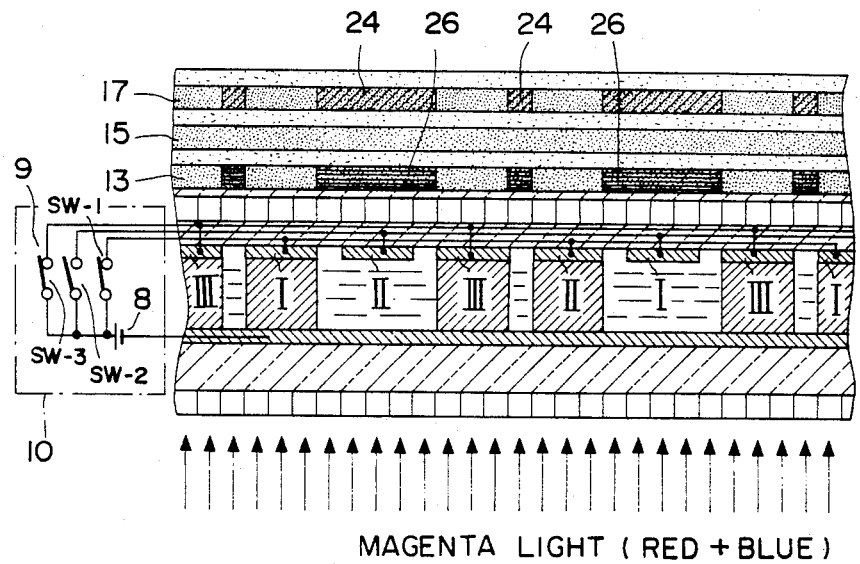
Figure 2:
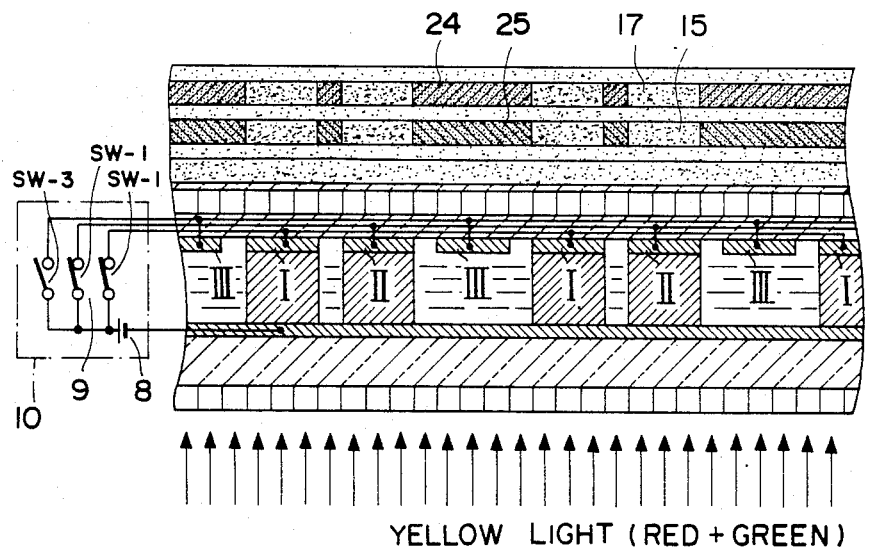
Figure 2:
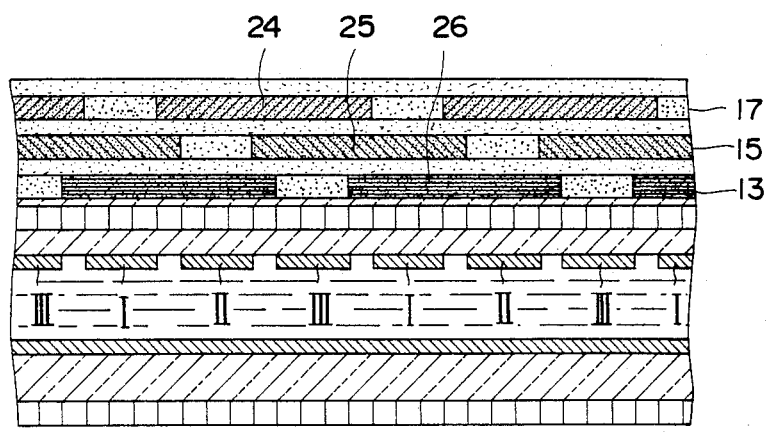
Figure 2:
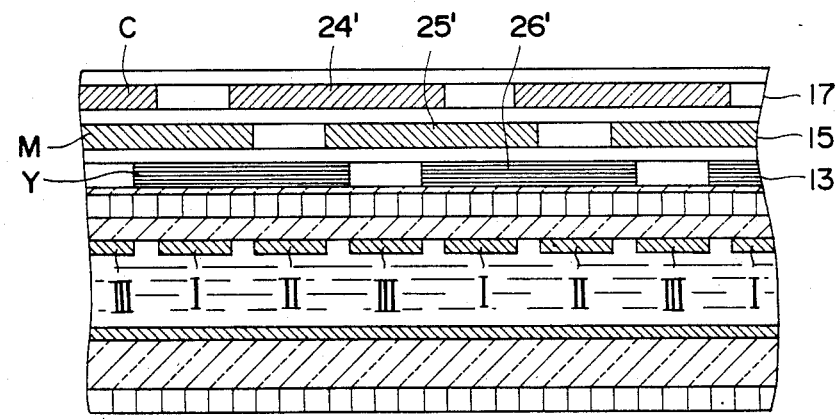

A liquid crystal shutter with a multilayer filter of FIG. 2 (A) was set on the photosensitive jig of FIG. 4. First, a cyan filter was set as the filter 21, and while the shutter was illuminated from the rear by cyan (green + blue) light, as shown in FIG. 2 (B), SW-2 and SW-3 were turned ON with SW-1 OFF. As a result, the light was prevented from passing through the portions II and III of the liquid crystal layer to which a voltage was applied through SW-2 and SW-3, and the portions of the green photosensitive emulsion layer 15 and the blue photosensitive emulsion layer 13 exposed to the light formed latent images 25, 26, respectively.

Next, a magenta filter was set on the photosensitive jig as the filter 21 in FIG. 4. While the shutter was illuminated from the rear by magenta (red + blue) light, as shown in FIG. 2 (C), SW-1 and SW-3 were turned ON with SW-2 OFF. As a result, the light was prevented from passing through the portions I and III of the liquid crystal layer to which a voltage was applied through SW-1 and SW-3, and the portions of the red photosensitive emulsion layer 17 and the blue photosensitive emulsion layer 13 formed latent images 24, 26, respectively.

Furthermore, a yellow filter was set as the filter 21. While the shutter was illuminated from the rear by yellow (red + green) light, as shown in FIG. 2 (D), SW-1 and SW-2 were turned ON with SW-3 OFF. As a result, the light was prevented from passing through the portions I and II of the liquid crystal layer to which a voltage was applied through SW-1 and SW-2, and the portions of the red photosensitive emulsion layer 17 and the green photosensitive emulsion layer 15 exposed to the light formed latent images 24, 25.

As mentioned above, latent images 24, 25 and 26 as shown in FIG. 2 (E) were formed on the red photosensitive emulsion layer 17, the green photosensitive emulsion layer 15 and the blue photosensitive emulsion layer 13, respectively. When developed, as shown in FIG. 2 (F), the latent images 24 were colored cyan 24', the images 25, magenta 25' and the images 26, yellow 26'.

Therefore, like the first example, when this liquid crystal display panel with a multilayer filter was illuminated from the rear by white light, the following colors appeared:

cyan 24' + magenta 25' = blue cyan 24' + yellow 26' = green magenta 25' + yellow 26' = red.

Also, the portion where these colors overlapped produced the following color:

cyan + magenta + yellow = black, thus causing black stripes.

EXAMPLE III

Figure 3:
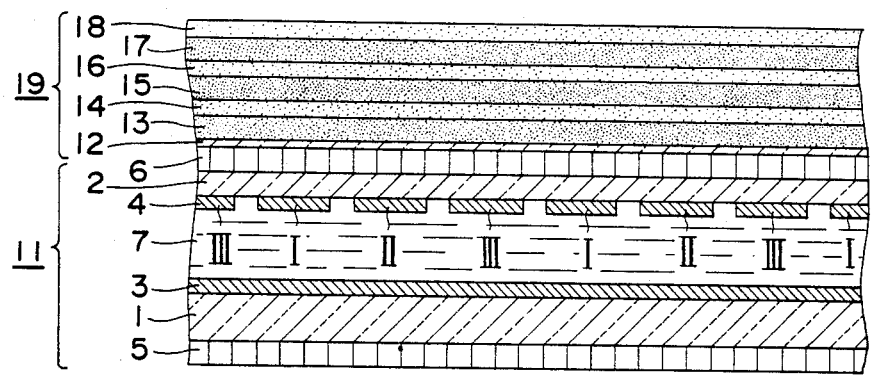
FIGS. 3(A) to (E) are partially sectional views of a third example.
Figure 3:
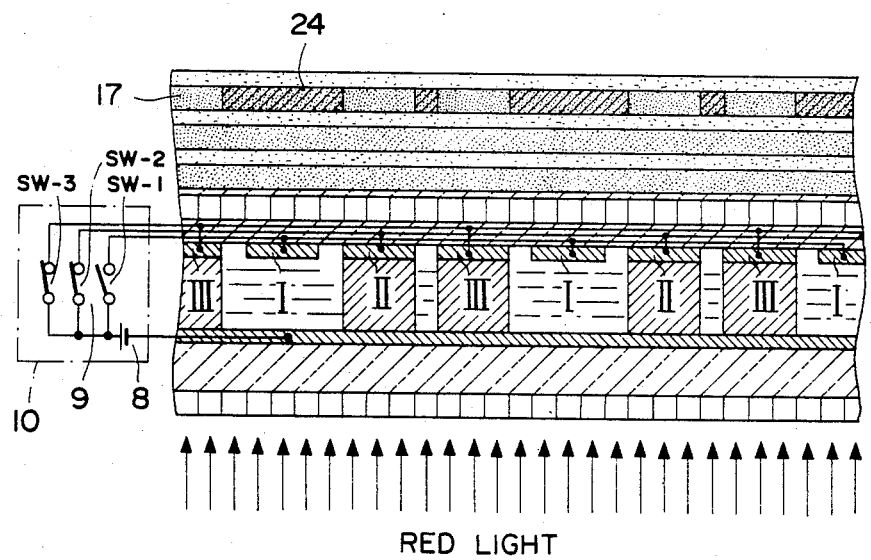
Figure 3:
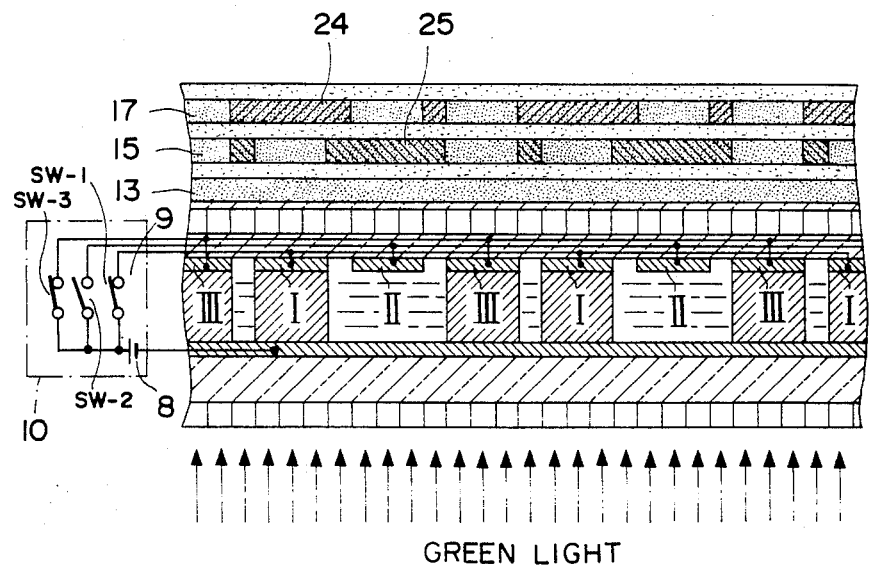
Figure 3:
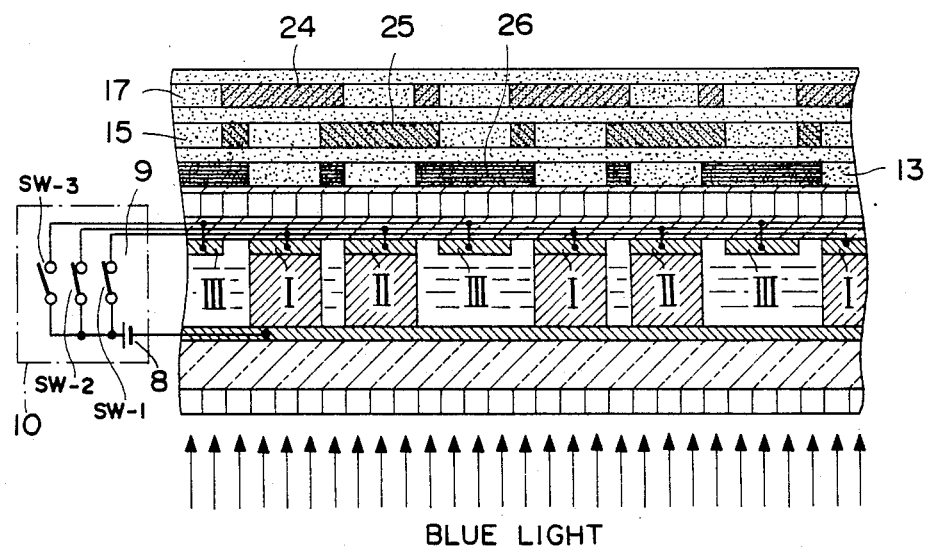
Figure 3:
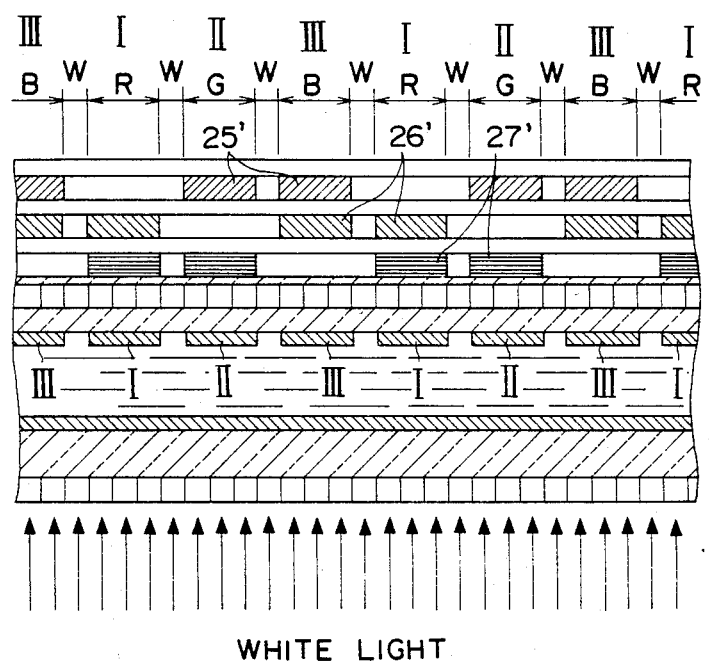

A liquid crystal shutter with a multilayer filter of FIG. 3 (A) was set on the photosensitive jig of FIG. 4. First, a red filter was set as the filter 21, and while the shutter was illuminated from the rear by red light, as shown in FIG. 3 (B), SW-2 and SW-3 were turned ON with SW-1 OFF. As a result, the light was prevented from passing through the portions II and III of the liquid crystal layer to which a voltage was applied through SW-2 and SW-3, and the portions of the red light photosensitive emulsion layer 17 exposed to the light formed latent images 24.

Next, a green filter was set on the photosensitive jig. While the shutter was illuminated from the rear by green light, as shown in FIG. 3 (C), SW-1 and SW-3 were turned ON with SW-2 OFF. As a result, the light was prevented from passing through the portions of the liquid crystal layer to which a voltage was applied through SW-1 and SW-3, and the portions of the green photosensitive emulsion layer 15 exposed to the light formed latent images 25.

Furthermore, a blue filter was set on the photosensitive jig. While the shutter was illuminated from the rear by blue light, as shown in FIG. 3 (D), SW-1 and SW-2 were turned ON with SW-3 OFF. As a result, the light was prevented from passing through the portions of the liquid crystal layer to which a voltage was applied through SW-1 and SW-2, and the portions of the blue photosensitive emulsion layer 13 exposed to the light formed latent images 26.

After forming the latent images 24, 25 and 26 on the respective photosensitive emulsion layers in this way, a negative picture was formed by a first development and then reversed and exposed. After a while, a second development was performed to produce colors, thus forming a color positive picture as shown in FIG. 3 (E).

As explained in detail in connection with the examples, the development of emulsion layers having selected colors and positions exposed to light permits color filters to be aligned with the liquid crystal color shutter.

When developed, the liquid crystal light shutter 11 was immersed together in the developing solution, and this posed no problem. However, it was necessary to protect the polyvinyl alcohol forming polarizing film of the polarizers 5 with polyethylene terephthalate. The liquid crystal light shutter in this invention can be applied to a matrix liquid crystal panel, twist nematic liquid crystal panel, liquid crystal panel using a nonlinear element and active matrix liquid crystal panel using a switching element.

As mentioned above, according to this invention, a multicolored filter can be fabricated for a high density liquid crystal filter without the need for human alighment. This invention eliminates the need for any conventional means for aligning the multicolored filter, thereby reducing production costs.

Also, in the fabricating process according to this invention, it is only necessary to set a plate provided with photosensitive emulsion layers and expose and develop it using a few jigs. This process is easier than the conventional printing process and dyeing process. As for the filter color purity, for example, as is well known in a positive type slide color film, the good color purity is obtained. Therefore, this invention has significant effects on the industry.

Needless to say, in the invention, an outer coloring method in which a coupler is not contained in a photosensitive emulsion can also be used. Also, the exposure light is not limited to the combination of blue, green and red or the combination of magenta, cyan and yellow, and any light other than visible light can be used depending on the photosensitive agent.

What is claimed is:
1. A liquid crystal display panel comprising:
   (1) a liquid crystal shutter device having,
      (a) a pair of opposed glass plates,
      (b) opposed electrode groups on the respective inner surfaces of the glass plates,
      (c) at least one polarizer,
      (d) a liquid crystal layer between the opposed electrode groups, and
      (e) a voltage applying means for selectively applying a voltage across the electrode groups, and
   (2) a color filter having a photosensitive emulsion layer sensitive to specific color light and provided on another transparent glass plate, the arrangement being such that the color filter is superposed on one surface of the liquid crystal shutter device and being processed by the steps of,
      (i) while illuminating the liquid crystal shutter device from the other surface thereof by the specific color light, applying the voltage across the opposed electrode groups through the voltage applying means to form a latent image on the photosensitive emulsion layer, the latent image being aligned with the electrode groups, and
      (ii) after a while, developing the latent image.
2. A liquid crystal display panel with a color filter of claim 1 wherein the color filter is formed by laminating a plurality of photosensitive emulsion layers each sensitive to specific color light on the transparent glass plate, while illuminating the liquid crystal shutter device from the other surface thereof by a plurality of different specific light, the plurality of photosensitive emulsion layers of each color being aligned with the selected electrode grous sequentially.
3. A light crystal display panel with a color filter comprising:
   (1) a liquid crystal shutter device having,
      (a) a pair of opposed glass plates,
      (b) opposed electrode groups on the respective inner surfaces of the glass plates,
      (c) at least one polarizer,
      (d) a liquid crystal layer between the opposed electrode groups, and
      (e) a voltage applying means for selectively applying a voltage across the electrode groups, and
   (2) a color filter having,
      (a) a blue photosensitive emulsion layer including a yellow color coupler and provided on another transparent glass plate,
      (b) a yellow coloid silver gelatin layer,
      (c) a green photosensitive emulsion layer including a magenta color coupler,

(d) an intermediate gelatin layer,
(e) a red photosensitive emulsion layer including a cyan color coupler, and
(f) a gelatin protective layer, the arrangement being such that the color filter is superposed on one surface of the liquid crystal shutter device and being processed by the steps of,
  (i) while illuminating the liquid crystal shutter device from the other surface thereof by one of red, green and blue light, applying a voltage across the first selected electrode groups through the voltage applying means to prevent the light from passing through the liquid crystal to which the voltage is applied and to expose a portion of the photosensitive emulsion layer sensitive to the color light, thereby forming a first pattern latent image,
  (ii) while illuminating the liquid crystal shutter device from the other surface thereof by one of red, green and blue color light other than the color light used for forming the first pattern latent image, applying a voltage across the second selected electrode groups through the voltage applying means to prevent the light from passing through the liquid crystal to which the voltage is applied and to expose a portion of the photosensitive emulsion layer sensitive to the color light, thereby forming a second pattern latent image,
  (iii) while illuminating the liquid crystal shutter device from the other surface thereof by one of red, green and blue color light other than the color light used for forming the first and second latent images, applying a voltage across the third selected electrode groups through the voltage applying means to prevent the light from passing through the liquid crystal to which the voltage is applied and to expose a portion of the photosensitive emulsion layer sensitive to the color light, thereby forming a third pattern latent image,
  (iv) after a while, developing the latent images to color the latent image formed on the red photosensitive layer, cyan, the latent image formed on the green photosensitive layer, magenta, and the latent image formed on the blue photosensitive layer, yellow,
  (v) whereby the plurality of color layers are laminated to form a multilayer and multicolored filter.

4. A liquid crystal display panel with a color filter comprising:
(1) a liquid crystal shutter device having,
  (a) a pair of opposed glass plates,
  (b) opposed electrode groups on the respective inner surfaces of the glass plates,
  (c) at least one polarizer,
  (d) a liquid crystal layer between the opposed electrode groups, and
  (e) a voltage applying means for selectively applying a voltage across the electrode groups, and
(2) a color filter having,
  (a) a blue photosensitive emulsion layer including a yellow color coupler and provied on another transparent glass plate,
  (b) a yellow coloid silver gelatin layer,
  (c) a green photosensitive emulsion layer including a magenta color coupler,
  (d) an intermediate gelatin layer,
  (e) a red photosensitive emulsion layer including a cyan color coupler, and
  (f) a gelatin protective layer, the arrangement being such that the color filter is superposed on the liquid crystal shutter device and being processed by the steps of,
    (i) while illuminating the liquid crystal shutter device from the other surface thereof by one of cyan, magenta and yellow light, applying a voltage across the first selected electrode groups through the voltage applying means to prevent the light from passing through the liquid crystal to which the voltage is applied and to expose portions of the two photosensitive emulsion layers each sensitive to the color light, thereby forming first pattern latent images on the two layers,
    (ii) while illuminating the liquid crystal shutter device from the other surface thereof by one of cyan, magenta and yellow color light other than the color light used for forming the first pattern latent images, applying a voltage across the second selected electrode groups through the voltage applying means to prevent the light from passing through the liquid crystal to which the voltage is applied and to expose portions of the two photosensitive emulsion layers each sensitive to the color light, thereby forming second pattern latent images on the two layers,
    (iii) while illuminating the liquid crystal shutter device from the other surface thereof by one of cyan, magenta and yellow color light other than the color light used for forming the first and second latent images, applying a voltage across the third selected electrode groups through the voltage applying means to prevent the light from passing through the liquid crystal to which the voltage is applied and to expose portions of the two photosensitive emulsion layers each sensitive to the color light, thereby forming third pattern latent images on the two layers,
    (iv) after a while, developing the latent images to color the latent image formed on the red photosensitive layer, cyan, the latent image formed on the green photosensitive layer, magenta, and the latent image formed on the blue photosensitive layer, yellow,
    (v) whereby the plurality of color layers are laminated to form a multilayer and multicolored filter.

5. A liquid crystal display panel with a color filter comprising:
(1) a liquid crystal shutter device having,
  (a) a pair of opposed glass plates,
  (b) opposed electrode groups on the respective inner surfaces of the glass plates,
  (c) at least one polarizer,
  (d) a liquid crystal layer between the opposed electrode groups, and
  (e) a voltage applying means for selectively applying a voltage across the electrode groups, and
(2) a color filter having,
  (a) a blue photosensitive emulsion layer including a yellow color coupler and provided on another transparent glass plate, (b) a yellow coloid silver gelatin layer,
(c) a green photosensitive emulsion layer including a magenta color coupler,
(d) an intermediate gelatin layer,
(e) a red photosensitive emulsion layer including a cyan color coupler, and
(f) a gelatin protective layer, the arrangement being such that the color filter is superposed on the liquid crystal shutter device and being processed by the steps of,
  (i) while illuminating the liquid crystal shutter device from the other surface thereof by one of red, green and blue light, applying a voltage across the first selected electrode groups through the voltage applying means to prevent the light from passing through the liquid crystal to which the voltage is applied and to expose a portion of the photosensitive emulsion layer sensitive to the color light, thereby forming a first pattern latent image,
  (ii) while illuminating the liquid crystal shutter device from the other surface thereof by one of red, green and blue color light other than the color light used for forming the first pattern latent image, applying a voltage across the second selected electrode groups through the voltage applying means to prevent the light from passing through the liquid crystal to which the voltage is applied and to expose a portion of the photosensitive emulsion layer sensitive to the color light, thereby forming a second pattern latent image,
  (iii) while illuminating the liquid crystal shutter device from the other surface thereof by one of red, green and blue color light other than the color light used for forming the first and second latent images, applying a voltage across the third selected electrode groups through the voltage applying means to prevent the light from passing through the liquid crystal to which the voltage is applied and to expose a portion of the photosensitive emulsion layer sensitive to the color light, thereby forming a third pattern latent image,
  (iv) after a while, developing the latent images by a first development to produce negative images and developing the negative images by a reversal color development to color the portions other than latent images formed on the red photosensitive emulsion layer, cyan, the portions other than latent images formed on the green photosensitive emulsion layer, magenta, and the portions other than latent images formed on the blue photosensitive emulsion layer, yellow,
  (v) whereby the plurality of color layers are laminated to form a multilayer and multicolored filter.

* * * * *